United States Patent [19]

Friesen

[11] Patent Number: 5,386,680
[45] Date of Patent: Feb. 7, 1995

[54] CLEVIS ASSEMBLY FOR TOWED IMPLEMENT

[75] Inventor: Henry Friesen, Niagara Falls, Canada

[73] Assignee: Deere & Company, Moline, Ill.

[21] Appl. No.: 75,422

[22] Filed: Jun. 14, 1993

[51] Int. Cl.$^6$ ............................................. A01D 34/07
[52] U.S. Cl. ...................................... 56/14.9; 56/15.7; 56/DIG. 14; 403/157
[58] Field of Search ............... 56/14.9, 15.2, 202, 56/16.6, DIG. 9, DIG. 14, DIG. 21, 15.8, 15.5; 280/416.1, 416.2, 414.5, 495; 172/248, 311, 272, 313, 328; 248/61, 59; 403/79, 157

[56] References Cited

U.S. PATENT DOCUMENTS

| | | | |
|---|---|---|---|
| 387,972 | 8/1888 | Folsom | 278/61 |
| 2,821,831 | 2/1958 | Thompson | 56/15.7 |
| 4,126,328 | 11/1978 | Old | 280/415 A |
| 4,542,913 | 9/1985 | Giesmann | 280/479 A |
| 4,684,280 | 8/1987 | Dirkin et al. | 403/79 |

OTHER PUBLICATIONS

Bush Hog Advertising Brochure, cover and back pages plus inside of cover page, undated but probably published before Jun. 1992.
Deere & Company Operator's Manual OMW40678 Issue C2, published 5 Feb. 1992, cover page and pp. 20-3 and 40-9, published in U.S.A.

Primary Examiner—Ramon S. Britts
Assistant Examiner—Pamela Anne O'Connor

[57] ABSTRACT

An implement includes a clevis assembly connected to the forward end of the implement hitch for limited fore-and-aft movement to permit holes in the clevis and of a tractor drawbar to become aligned for receiving a hitch pin, a latch then being operable to prevent further fore-and-aft movement of the clevis. First and second parallel legs of the clevis are provided with holes in which are received first and second bushing portions respectively of first and second jaws. The bushing portion of the first jaw is threaded and the hitch pin has a threaded end received therein, the pin being operable to move the first jaw towards the second jaw so that the jaws may tightly clamp a drawbar located therebetween.

14 Claims, 2 Drawing Sheets

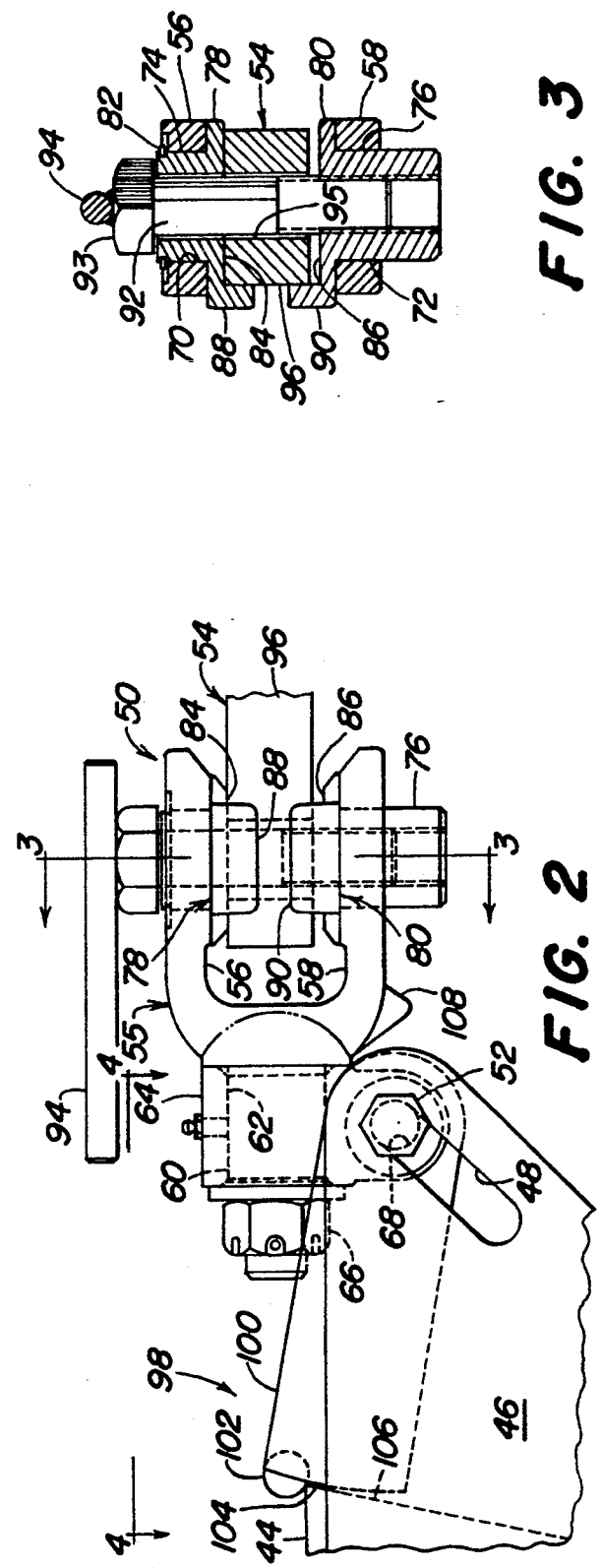

CLEVIS ASSEMBLY FOR TOWED IMPLEMENT

BACKGROUND OF THE INVENTION

The present invention relates to a clevis assembly for a towed implement and more particularly relates to a clevis adapted for being hitched to a tractor drawbar.

Tractor drawn implements, such as pull-type rotary cutters, require a hitch-to-drawbar connection that allows for rotation in three directions, namely, turning, twisting and pitching. Most drawn implement hitches only allow for turning about the vertical axis of the drawbar pin, with slop in the hitch-to-drawbar connection allowing for movement in the other two directions. Some implements, including rotary cutters, provide two-way rotation (turning and pitching) using a pivoting clevis and others provide three-way rotation by using two pivoting clevises, but because of the relatively high weight of the implement carried by the drawbar, the drawbar and clevis tend to wear and fail prematurely. Furthermore, even though it is possible to size the hitch pin and clevis so that a tight, swivel connection may be made between the clevis and the drawbar, such sizing would make hook-up of the hitch more difficult and could possibly result in the inability of a different tractor to be connected to the implement or in the sizing being wrong for gaining any benefit.

On some cutters, a leveling rod is mounted between the clevis and the front of the mower deck to keep the clevis level as the cutter is raised and lowered so as to minimize stresses imposed on the connection, but this system does not allow for rotation during pitching, and in some cases twisting movements of the cutter relative to the tractor.

Also, with the hitches used on current implements, it is difficult to align the hitch and drawbar holes for receiving the hitch pin during hook-up of the implement to the tractor, especially when there's only one person.

SUMMARY OF THE INVENTION

According to the present invention, there is provided an improved clevis assembly which overcomes the drawbacks associated with prior art clevis assemblies.

A broad object of the invention is to provide a clevis assembly having a set of jaws adjustable relative to each other for being clamped tight against a tractor drawbar so as to remove the slop between the drawbar and clevis so as to reduce wear.

Another object of the invention is to provide a clevis having adjustable jaws, as set forth in the previous object, wherein the hitch pin is threaded into an adjustable jaw element for adjusting the same upon rotating the pin.

Yet another object of the invention is to provide a clevis assembly including a clevis which is mounted to the remainder of the implement hitch for limited fore-and-aft movement for aiding in the hook-up of the clevis to a tractor drawbar, and to provide a selectively operable latch movable between latched and unlatched positions respectively preventing and permitting fore-and-aft clevis movement.

Still another object of the invention is to provide a clevis pivotally mounted to the implement frame by a horizontal transverse connection pin located below the line of draft of the drawbar when the clevis is connected to the latter so that draft forces will counteract the vertical forces exerted on the clevis by the implement and in this way reduce wear between the clevis and jaws carried thereby and gripping the drawbar.

These and other objects will become apparent from a reading of the ensuing description together with the appended drawings.

BRIEF DESCRIPTION OF THE DRAWING

FIG. 1 is a right side elevational view of a rotary cutter equipped with a clevis assembly constructed in accordance with the principles of the present invention.

FIG. 2 is an enlarged view of the clevis assembly shown in FIG. 1.

FIG. 3 is a vertical sectional view taken along line 3—3 in FIG. 2.

DESCRIPTION OF THE PREFERRED EMBODIMENT

Figure 4:
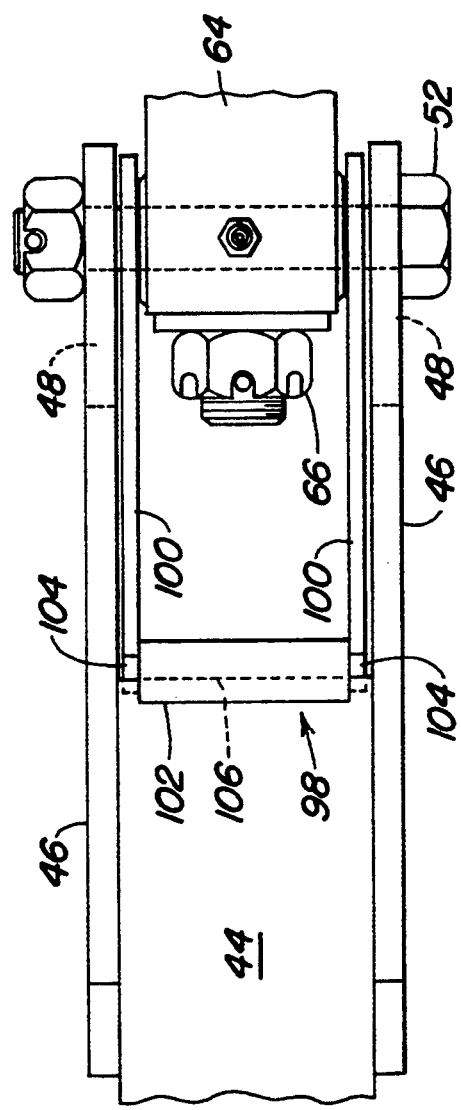
FIG. 4 is a top view taken along line 4—4 of FIG. 2.

Referring to FIG. 1, there is shown a towed implement 10, here configured as a rotary cutter, but for simplicity shown without its cutter blade drive train. The implement 10 includes a blade housing 12 supported at opposite sides of its forward end by respective skids or wear shoes 14 and supported at its rear by one or more sets of ground wheels 16, with only one skid and one wheel being shown. The ground wheels 16 are each mounted to the rear end of a channel-like arm 17 that is positioned between the legs of and pivotally attached to a main channel-shaped arm 18. Springs, not shown, act between the arms 17 and 18 and yieldably bias the arms 17 downwardly. The arms 18 are fixed to a cross member 19 having downwardly projecting lugs 20 each being respectively received between and pivotally mounted, as at pins 22, to respective transversely spaced pairs of rearward projections 23 of the housing 12. The pairs of rearward projections 23 each form a rearward extension of a respective, fore-and-aft extending stiffening member 24 that is integral with the top of the housing 12. The stiffening members 24 (only one shown) are each in the form of an inverted u-shaped channel having its legs welded to the housing top. Generally triangular, forwardly opening u-shaped hitch supports 26 are integral with the forward ends of and form forward extensions of the stiffening members 24. A lift cylinder (not shown) is mounted between a bracket 28, integral with the top of the right-hand stiffening member 24 and an ear 30 integral with and projecting upwardly from the cross member to which the wheel-mounting arms 18 are fixed. A draft hitch or tongue 32 includes a cylindrical tubular cross member 34 having plate assemblies 36 welded across each end, the plate assemblies each including inner and outer plates having spaced apart, parallel, upwardly and rearwardly extending portions joined at their upper ends by a bushing (not shown) welded therebetween. A pin 38 is received in a cylindrical bushing 40 located in an upper forward location of each of the hitch supports 26 and projects into the associated bushing of a respective one of the plate assemblies 36 so as to establish a pivotal connection of the hitch or tongue 32 with the housing 12. The hitch 32 is further defined by a pair of forwardly converging members 42 having their rearward ends fixed to the cross member 34 at laterally spaced locations and having their forward ends fixed to opposite sides of a centrally located, fore-and-aft extending square tubular member 44. A pair of vertical plates 46 are fixed to and project forwardly from opposite lateral faces of the member 44, are provided with transversely aligned fore-and-aft elongated, clevis adjustment slots 48 and have the rear portion of a clevis assembly 50 received therebetween and connected thereto by a horizontal coupling or connection pin 52 extending through the slots 48. It is here noted that when the clevis 55 is in a horizontal disposition, as shown in FIG. 2, the slots 48 are inclined downwardly from front to rear such that the weight of the implement acting at the clevis will tend to move the coupling pin 52 to its operating position at the front of the slots 48. The clevis assembly 50 is shown coupled to a drawbar 54 of a towing tractor, not otherwise shown.

Referring now also to FIGS. 2 and 3, it can be seen that the clevis assembly 50 includes a clevis 55 having upper and lower legs 56 and 58, respectively, joined together and to a cylindrical stem 60 at their rear ends. The stem 60 is journalled in a fore-and-aft throughbore 62 of a pivot member 64, the rear end of the stem 60 being threaded and having a nut 66 threaded thereon. The pivot member 64 also includes a cross bore 68 located beneath the throughbore 62 which receives the coupling pin 52. As can best be seen in FIG. 3, the upper and lower clevis legs 56 and 58 are provided with respective bores 70 and 72 which are axially aligned and respectively receive bushing portions 74 and 76 of clevis jaws 78 and 80, the bushing portion 76 of the lower jaw 80 being threaded for a purpose explained below. The bushing portion 74 of the upper clevis jaw 78 is held in place by a snap ring 82 located in an annular groove in the upper end of the bushing portion 74. The upper and lower jaws 78 and 80 include respective opposed clamping surfaces 84 and 86 and respective lugs 88 and 90 which project towards each other and make a right angle with the horizontal clamping surfaces. A hitch pin 92, in the form of a capscrew having a head 93, is received in the bushing portions of the clevis jaws 78 and 80 and has a threaded lower end threaded into the lower clevis jaw. A handle 94, in the form of a rod, is welded to the hitch pin head 93. When the drawbar 54 is hitched to the clevis 55, as shown, the drawbar is disposed between the jaws 78 and 80 and the pin 92 extends through a hole 95 provided in the drawbar. The respective lugs 88 and 90 of the clevis jaws engage side surface 96 of the drawbar so as to prevent relative rotation between the drawbar and the clevis jaws. It will be appreciated that, by rotating the hitch pin 92 such as to advance its threads downwardly into the bushing portion 76 of the lower clevis jaw 80, the lower clevis jaw will be raised from its lower position, shown in FIGS. 2 and 3, so as to bring the clamping surface 86 into engagement with the bottom of the drawbar once the head 93 of the capscrew comes into contact with the top of the bushing portion 74 of the upper clevis jaw 78. Thus, the clevis jaws 78 and 80 may be clamped against opposite top and bottom surfaces of the drawbar 54. It is significant to note that the line of action of the draft force transmitted through the drawbar 54 will now pass horizontally above the connection pin 52. Thus, it will be appreciated that draft forces will counteract the vertical forces acting at the clevis jaw/drawbar interface, thereby reducing the wear between the clevis legs 56 and 58 and the jaws 78 and 80.

It is here noted that the length of the bushing portion 74 of the upper clevis jaw 78 is less than the maximum spacing, that shown in FIGS. 2 and 3, between the clamping surfaces 84 and 86 while the length of the bushing portion 76 of the lower clevis jaw 80 is greater than such maximum spacing between the surfaces 84 and 86. These dimensions of the bushing portions 74 and 76 are important since it results in it being impossible for the lower jaw 80 to come loose from the lower clevis leg 58 so long as the upper jaw 78 is installed in the upper clevis leg 56. Thus, during times when the hitch pin 92 is removed from the clevis assembly 50, the lower jaw 80 will not accidentally come loose from the assembly.

Provided for restraining fore-and-aft movement of the clevis coupling pin 52 in the adjustment slots 48 is a U-shaped latch 98 comprising a pair of identical straps 100 having first ends respectively located on the coupling pin 52 at opposite sides of the pivot member 64 and having rear ends connected together by a handle 102 formed by a cylindrical pin. The straps 100 have rear ends 104 formed at a radius about the mounting holes receiving the pin 52, with a major portion of the rear ends 104 extending below the handle 102 when the latch 98 is in a rearwardly pivoted latched position, as shown in FIG. 2, wherein the pin 52 is located in an operating position at the extreme forward ends of the slots 48, the radiused rear ends 104 of the straps are wedged against upwardly and forwardly inclined side edges 106 at the front of the tubular hitch member 44 and the handle 102 rests against an upper forward location of the member 44. During hook-up of the implement 10 to the towing tractor drawbar 54, the latch 98 will be in a forwardly pivoted release position wherein the clevis 55 is permitted to move fore-and-aft the full length of the adjustment slots 48 so as to aid an operator in aligning the holes in the clevis 54 with the hole 95 in the drawbar 54.

An operator is further aided in connecting the clevis assembly 50 to the drawbar 54 by additional structure of the clevis assembly, which becomes useful after the hitch or tongue 32 has been adjusted to a desired elevation by operation of a conventional parking stand or jack (not shown). Specifically, a leveling pin abutment 108 protrudes downwardly from a bottom rear location of the lower leg 58 of the clevis 54. In order to permit the operator to be able to back the tractor to accurately place the drawbar 54 relative to the clevis assembly 50, the operator may lift the clevis 55 to a horizontal attitude for receiving the drawbar 54 between the clamping jaws 78 and 80 and retain it in this disposition by removing the hitch pin 92 from the clevis assembly and inserting the handle 94 into the adjustment slots 48 once the connection pin 52 is moved to the rear ends of the slots, the handle 94 then bearing against the abutment 108. Once the drawbar is located between the clevis jaws 78 and 80, the handle 94 may be removed from the slots 48 and the clevis 55 may be shifted, if necessary, to align the holes through the bushings 88 and 90 with the hole in the drawbar. The pin 92 is then inserted through the bushing 88 and drawbar 54 and threaded into the lower bushing 90, by using the handle 94, until the upper and lower clamping surfaces 84 and 86 are tightly engaged with top and bottom surfaces of the drawbar 54. The jackstand is then operated to transfer any weight of the implement borne by the jackstand to the drawbar 54 by way of the connection pin 52 and the clevis assembly 50. This weight will act to move the pin 52 to the forward end of the slots 48 whereupon the latch 98 may be rotated rearwardly to its latch position wherein the arcuate surface 104 bears against the inclined forward surface 106 of the hitch member 44. It is here noted that if desired, a relatively light spring may be coupled between the latch 98 and a location on the hitch 32 to provide a bias urging the latch 98 towards its latched position to ensure the movement of the latch to its latched position anytime the pin 52 moves to the forward end of the slots 48.

We claim:

1. A clevis assembly, comprising: a clevis having first and second parallel legs that are spaced apart for receiving a tractor drawbar therebetween; said legs each being provided with a hitch pin hole with the holes being axially aligned with each other; a first jaw member including a interiorly threaded bushing portion axially shiftably received in the hitch pin hole in the first clevis leg and having a clamping surface facing the second clevis leg; and a hitch pin extending through the hitch pin hole in the second clevis leg and including a head at one end and an opposite threaded end received in the threaded bushing portion so that by turning the hitch pin in a direction for advancing its threads into the bushing portion the jaw member together with its clamping surface will be moved toward the first leg of the clevis, whereby the clamping surface of said first jaw member is adapted for being drawn against a drawbar disposed between the clamping surface and said first clevis leg and having a coupling hole aligned with the holes in the clevis legs and receiving said hitch pin.

2. The clevis assembly defined in claim 1 wherein a second jaw member including a second bushing portion having a smooth interior is removably mounted in the hitch pin hole of the second clevis leg, said second jaw member having a clamping surface facing the clamping surface of the first jaw member, whereby turning of the hitch pin in a direction for advancing it into the threaded bushing portion will effect movement of the clamping surface of the first jaw member toward the clamping surface of the second jaw member.

3. The clevis assembly defined in claim 2 wherein said first and second jaw members each have respective legs projecting towards each other from the respective clamping surfaces of the first and second jaw members, the legs being located so as to be adapted for engaging a side surface of a drawbar coupled to the clevis by the hitch pin so as to prevent the jaws from rotating relative to the drawbar.

4. The clevis assembly defined in claim 2 and further including retention for releasably securing said bushing portion of said second jaw member in the hitch pin hole of said second clevis leg; Said first and second jaw members being dimensioned such that only their respective bushing portions can fit inside said hitch Din holes, and the maximum distance between the clamping surfaces of said first and second jaw members is less than a length dimension of the bushing portion of the first jaw member and greater than a length dimension of the bushing portion of the second jaw member, whereby once the bushing portion of the first jaw member is installed in the hitch pin hole of said first clevis leg it will not be able to escape from the first clevis leg once the bushing portion of the second jaw member is installed in the hitch pin hole of said second clevis leg and captured by said retention means.

5. The clevis assembly defined in claim 2 and further including an implement hitch having a fore-and-aft extending adjustment slot means in a forward location thereof; and connection means coupling said clevis to said hitch and including a connection pin received in said slot means for permitting limited fore-and-aft movement of said clevis for aiding an operator in aligning said hitch pin holes of the first and second legs of clevis with a mounting hole of a drawbar for permitting the installation of the hitch pin.

6. The clevis assembly defined in claim 5 and further including releasable latch means for selectively latching the connection pin in a foremost location in said slot means, whereby said clevis may be retained in a fixed fore-and-aft location relative to said hitch during operation of the implement with which the hitch is associated.

7. The clevis assembly defined in claim 5 wherein said slot means is inclined upwardly from rear to front when considered with the clevis in a horizontal disposition, whereby when said clevis is coupled to a tractor drawbar the weight of the implement will aid in the movement of the connection pin to the foremost location in said slot means.

8. A combination of a clevis assembly and an implement hitch, comprising: said clevis assembly including a clevis which is adapted to be disposed in a generally horizontal working position when coupled to a drawbar of a tractor located on a horizontal surface, with a horizontal line of draft then being established through the drawbar and between opposite legs of the clevis; and mounting means coupling said clevis to a forward end location of said hitch for pivotal movement about a horizontal transverse axis located below said line of draft, whereby, when a drawbar is connected to the clevis, forces acting along said line of draft will counteract vertical forces imposed on the clevis by the implement thereby reducing wear to the clevis assembly.

9. The combination defined in claim 8 wherein said mounting means includes a pivot member containing a cross bore receiving a connection pin coupling the clevis to the forward end location of the hitch for pivotal movement about said horizontal axis; said pivot member also including a throughbore located above and disposed at a right angle to said cross bore; and rear portions of said opposite legs of said clevis being integral with a cylindrical stem swivelly mounted in said throughbore thereby establishing a horizontal, longitudinal pivot axis located on said line of draft.

10. A combination of a clevis assembly and an implement hitch, comprising: said clevis assembly including a clevis; and mounting means coupling said clevis to a forward end location of said hitch for limited fore-and-aft movement relative to the hitch, whereby an operator connecting the clevis to a tractor drawbar may move the clevis in order to align coupling holes thereof with a coupling hole of the drawbar to permit the insertion of a hitch pin.

11. The combination defined in claim 10 and further including latch means operable between latch and release positions for respectively preventing and permitting said limited fore-and-aft movement of the clevis, whereby said movement may be locked out during operation of an implement with which the hitch and clevis are adapted for use.

12. The combination defined in claim 10 wherein said implement hitch includes a pair of vertical, spaced apart, parallel plates at its forward end; said clevis assembly including a pivot member coupled to said clevis and having a crossbore; fore-and-aft extending slots provided in said pair of plates; and a horizontal connection pin received in said crossbore and slots.

13. The combination defined in claim 12 wherein said clevis assembly further includes a latch comprising a pair of straps having first ends pivotally connected to said connection pin at locations adjacent opposite sides of said pivot member and second ends joined by a handle; said implement hitch including an abutment surface located in rearwardly spaced relationship to said slots; and said latch having a surface engageable with said abutment surface when the latch is rotated to a rearward latched position wherein it releasably retains said connection pin in a forward most location in the slots.

14. The combination defined in claim 13 wherein said slots are upwardly and forwardly inclined, from rear to front as considered when the clevis is in a horizontal disposition, whereby the weight of the implement will act to move the connection pin to the forward most location in the slots.

* * * * *